United States Patent
Piao et al.

(10) Patent No.: US 11,476,453 B2
(45) Date of Patent: Oct. 18, 2022

(54) NEGATIVE ELECTRODE ACTIVE MATERIAL, AND NEGATIVE ELECTRODE AND LITHIUM SECONDARY BATTERY COMPRISING SAME

(71) Applicant: LG CHEM, LTD., Seoul (KR)

(72) Inventors: Lilin Piao, Daejeon (KR); Je Young Kim, Daejeon (KR); Ju Ho Chung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 262 days.

(21) Appl. No.: 16/884,538

(22) Filed: May 27, 2020

(65) Prior Publication Data
US 2020/0295351 A1    Sep. 17, 2020

Related U.S. Application Data

(63) Continuation of application No. PCT/KR2018/014865, filed on Nov. 28, 2018.

(30) Foreign Application Priority Data

Nov. 28, 2017   (KR) .................. 10-2017-0160819

(51) Int. Cl.
*H01M 4/133* (2010.01)
*H01M 10/0525* (2010.01)
*H01M 4/02* (2006.01)

(52) U.S. Cl.
CPC ....... *H01M 4/133* (2013.01); *H01M 10/0525* (2013.01); *C01P 2002/74* (2013.01); *H01M 2004/021* (2013.01); *H01M 2004/027* (2013.01)

(58) Field of Classification Search
None
See application file for complete search history.

(56) References Cited

U.S. PATENT DOCUMENTS

2008/0199777 A1*  8/2008  Onishi ............... H01M 4/0409
                                                         423/448
2009/0214954 A1*  8/2009  Onishi ............... H01M 4/0404
                                                         429/231.8
(Continued)

FOREIGN PATENT DOCUMENTS

CN    101053098 A    10/2007
CN    102148375 A     8/2011
(Continued)

OTHER PUBLICATIONS

International Search Report issued in PCT/KR2018/014865 (PCT/ISA/210), dated Mar. 4, 2019.
(Continued)

*Primary Examiner* — Wyatt P McConnell
(74) *Attorney, Agent, or Firm* — Birch, Stewart, Kolasch & Birch, LLP

(57) ABSTRACT

A negative electrode active material including artificial graphite secondary particles comprising artificial graphite primary particles having an average particle diameter (D50) of 10 nm to 9 μm, said artificial graphite secondary particles being formed by granulating said artificial graphite primary particles, wherein a value ($V_1$) obtained by dividing a minimum particle diameter ($D_{min}$) of the secondary particles by the average particle diameter ($D_{50}$) of the initial particles is 0.50 to 0.8, and a value ($V_2$) obtained by dividing the minimum particle diameter ($D_{min}$) of the secondary particles by an average particle diameter ($D_{50}$) of the secondary particles is 0.23 to 0.4.

16 Claims, 4 Drawing Sheets

(56) References Cited

U.S. PATENT DOCUMENTS

| | | |
|---|---|---|
| 2011/0195308 A1 | 8/2011 | Lee et al. |
| 2016/0276657 A1 | 9/2016 | Song et al. |
| 2018/0190985 A1 | 7/2018 | Choi et al. |

FOREIGN PATENT DOCUMENTS

| | | |
|---|---|---|
| JP | 2007-173156 A | 7/2007 |
| JP | 2011-3332 A | 1/2011 |
| JP | 2011-96491 A | 5/2011 |
| JP | 2017-50184 A | 3/2017 |
| JP | 2017-130274 A | 7/2017 |
| KR | 10-1685832 B1 | 12/2016 |
| KR | 10-2017-0048210 A | 5/2017 |
| KR | 10-2017-0075661 A | 7/2017 |

OTHER PUBLICATIONS

"A Basic Guide to Particle Characterization," Malvern Instruments Worldwide—White Paper, May 2, 2012, pp. 1-26.

Extended European Search Report for European Application No. 18884550, dated Jul. 21, 2020.

\* cited by examiner

NEGATIVE ELECTRODE ACTIVE MATERIAL, AND NEGATIVE ELECTRODE AND LITHIUM SECONDARY BATTERY COMPRISING SAME

CROSS-REFERENCE TO RELATED APPLICATIONS

This application is a By-Pass Continuation of International Application PCT/KR2018/014865, which claims the benefit of Korean Patent Application No. 10-2017-0160819, filed on Nov. 28, 2017, in the Korean Intellectual Property Office, the disclosures of which are incorporated herein in their entirety by reference.

TECHNICAL FIELD

Technical Field

The present invention relates to a negative electrode active material, and a negative electrode and a lithium secondary battery comprising the same.

Background Art

As technology development and demand for mobile devices have increased, the demand for secondary batteries as an energy source has been rapidly increased. Among such secondary batteries, lithium secondary batteries having high energy density and operating potential, long cycle life, and low self-discharging rate have been commercialized and widely used.

Typically, a lithium metal has been used as a negative electrode of a secondary battery. However, since a risk of battery short circuit due to the formation of a dendrite and battery explosion caused thereby became known, the lithium metal has been replaced by a carbon-based compound (i.e., carbon containing compound) capable of intercalation and de-intercalation of reversible lithium ions while maintaining the structural and electrical properties thereof.

The carbon-based compound has a very low discharge potential of about −3 V with respect to a standard hydrogen electrode potential, and exhibits excellent electrode cycle life properties due to highly reversible charge and discharge behavior caused by uniaxial orientation of a graphene layer. Also, when Li ions are charged, the electrode potential is 0V Li/Li+, exhibiting a potential almost similar to that of a pure lithium metal, so that there is an advantage in that when an oxide-based positive electrode and a battery are formed, higher energy may be obtained.

The negative electrode for a secondary battery using a carbon-based compound is typically manufactured by mixing a carbon-based compound as a negative electrode active material with, when necessary, a conductive material and a binder to prepare negative electrode active material slurry, and then applying the slurry on an electrode current collector, such as copper foil, followed by drying. When applying the slurry, in order to press active material powder onto the current collector and to uniformize the thickness of the electrode, a roll-pressing process is performed.

Natural graphite, which is typically used as a negative electrode, has a large capacity per unit weight, but the degree of orientation is increased when an electrode is pressed, thereby deteriorating the inflow/outflow properties of lithium ions, so that there is a disadvantage in that rapid charging properties of a battery are deteriorated. In comparison, artificial graphite has a relatively low degree of orientation compared to natural graphite when an electrode is pressed, thereby having good input/output properties of lithium ions, so that there are advantages in that rapid charging properties of a battery are improved.

As the artificial graphite, secondary particles, that is, granulated artificial graphite is mainly used. Among various elements of the artificial graphite, the size of initial particles constituting the secondary particles affects rapid charging performance. Accordingly, in order to improve the rapid charging performance, the size of the initial particles constituting the secondary particles needs to be adjusted.

Therefore, there is a demand for the development of a new technology to maximize the rapid charging properties of artificial graphite by adjusting the size of initial particles constituting secondary granulated artificial graphite.

DISCLOSURE OF THE INVENTION

Technical Problem

An aspect of the present invention provides a negative electrode active material having excellent rapid charging properties of a battery by suppressing an increase in an orientation of an electrode when the electrode is roll-pressed.

Another aspect of the present invention provides a negative electrode comprising the negative electrode active material.

Another aspect of the present invention provides a lithium secondary battery comprising the negative electrode and having excellent rapid charging properties.

Technical Solution

According to an aspect of the present invention, there is provided a negative electrode active material comprising artificial graphite secondary particles comprising artificial graphite primary particles having an average particle diameter (D50) of 10 nm to 9 µm, said artificial graphite secondary particles being formed by granulating said artificial graphite primary particles, wherein a value ($V_1$) obtained by dividing a minimum particle diameter ($D_{min}$) of the secondary particles by the average particle diameter ($D_{50}$) of the initial particles is 0.50 to 0.8, and a value ($V_2$) obtained by dividing the minimum particle diameter ($D_{min}$) of the secondary particles by an average particle diameter ($D_{50}$) of the secondary particles is 0.23 to 0.4.

According to another aspect of the present invention, there is provided a negative electrode for a lithium secondary battery, the negative electrode comprising the negative electrode active material for a lithium secondary battery, wherein an electrode orientation is 13.5 or less when the electrode has a porosity of 28%.

According to yet another aspect of the present invention, there is provided a lithium secondary battery comprising the negative electrode for a lithium secondary battery.

Advantageous Effects

A negative electrode active material according to the present invention may be that wherein the size of artificial graphite secondary particles and the size of artificial graphite initial particles making up the secondary particles are adjusted to a suitable ratio and the initial particles and the secondary particles are configured to have physical properties in a specific range, so that excellent rapid charging properties may be exhibited.

BRIEF DESCRIPTION OF THE DRAWINGS

The following drawings attached herein illustrate preferred embodiments of the present invention by example, and serve to enable technical concepts of the present invention to be further understood together with detailed description of the invention given below, and therefore the present invention should not be interpreted only with matters in such drawings.

BEST MODE FOR CARRYING OUT THE INVENTION

Figure 1:
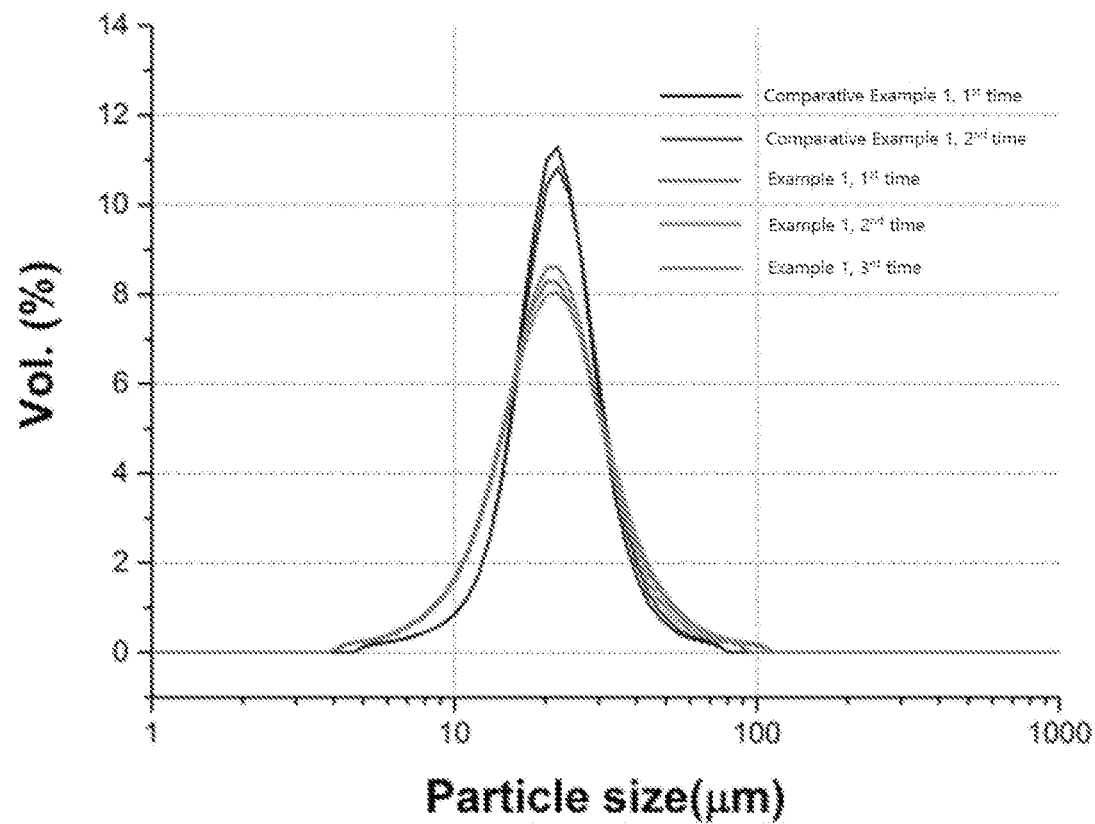
FIG. 1 is a view showing the results of measuring the particle size distribution (PSD) of each of the negative active materials of Example 1 and Comparative Example 1.

Hereinafter, the present invention will be described in more detail to facilitate understanding of the present invention.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may comprise plural forms unless the context clearly indicates otherwise.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

A negative electrode active material of an embodiment of the present invention is a negative electrode active material comprising artificial graphite secondary particles comprising artificial graphite primary particles having an average particle diameter (D50) of 10 nm to 9 μm, said artificial graphite secondary particles being formed by granulating said artificial graphite primary particles, wherein a value ($V_1$) obtained by dividing a minimum particle diameter ($D_{min}$) of the secondary particles by the average particle diameter ($D_{50}$) of the initial particles is 0.50 to 0.8, and a value ($V_2$) obtained by dividing the minimum particle diameter ($D_{min}$) of the secondary particles by an average particle diameter ($D_{50}$) of the secondary particles is 0.23 to 0.4.

The negative electrode active material according to an embodiment of the present invention comprises a secondary particle form in which artificial graphite initial particles having an average particle diameter ($D_{50}$) of 10 nm to 9 μm are agglomerated by aggregation, bonding or granulation. The negative electrode active material according to the present invention may exhibit excellent rapid charging properties when using artificial graphite secondary particles by adjusting the size of artificial graphite secondary particles and the size of artificial graphite initial particles making up the secondary particles to a suitable ratio.

The initial particle refers to a particle which becomes a component when a different kind of particle is formed from a certain particle, and a plurality of initial particles may be aggregated, bonded, or agglomerated to be granulated to form a secondary particle. That is, the secondary particle refers to a particle in which individual initial particles are granulated by aggregation, bonding, or agglomeration.

The artificial graphite initial particle may have an average particle diameter ($D_{50}$) 10 nm to 9 μm, specifically 100 nm to 9 μm, more specifically 1 μm to 9 μm, even more specifically 5 μm to 8 μm.

When the size of the artificial graphite initial particle is reduced, it is possible to reduce the diffusion distance of Li, so that Li may move more easily, and thus, the resistance is reduced and rapid charging performance may be increased. That is when average particle diameter ($D_{50}$) of the artificial graphite initial particle satisfies the range of 10 nm to 9 μm, the effects described above may be exhibited. On the contrary, when the average particle diameter ($D_{50}$) of the artificial graphite initial particle is less than 10 nm, the capacity of the active material may be reduced. Accordingly, in order to manufacture a secondary battery comprising the same to have a high capacity, the thickness of a negative electrode is increased, so that lifespan properties may be deteriorated. Meanwhile, when the average particle diameter ($D_{50}$) of the artificial graphite initial particle is greater than 9 μm, the diffusion distance of Li is increased and the surface area in which particles and an electrolyte contact each other is relatively reduced. As a result, the intercalation and de-intercalation of lithium ions are not easily achieved, causing the increase in diffusion resistance and occurrence of lithium precipitation during high-rate charging/discharging, so that lifespan properties may be deteriorated.

In an embodiment of the present invention, the artificial graphite initial particles may be present in the artificial graphite secondary particles in an amount of 70 wt % to 99 wt %, specifically 75 wt % to 98 wt %, more specifically 80 wt % to 95 wt % based upon the total amount of the artificial graphite secondary particles.

In an embodiment of the present invention, as the initial particles, carbon-based initial particles may be further included other than the artificial graphite initial particles and granulated theretogetherwith. Stated differently, the carbon-based initial particles are different from the artificial graphite initial particles. The carbon-based initial particles other than the artificial graphite initial particles may comprise, for example, natural graphite. The carbon-based initial particles other than the artificial graphite initial particles may have an average particle diameter ($D_{50}$) of 10 nm to 9 μm, specifically 100 nm to 9 μm, more specifically 1 μm to 9 μm, even more specifically 5 μm to 8 μm. The carbon-based initial particles and the artificial graphite initial particles may be present in the secondary particles in an amount of 70 wt % to 99 wt %, specifically 75 wt % to 98 wt %, more specifically 80 wt % to 95 wt % based upon the total amount of the artificial graphite secondary particles.

In an embodiment of the present invention, the artificial graphite initial particles and carbon-based initial particles may have a weight ratio of ranging from 5:95 to 50:50, specifically 10:90 to 40:60, more specifically 10:90 to 30:70.

Meanwhile, in an embodiment of the negative electrode active material according to the present invention, artificial graphite secondary particles formed by granulating the artificial graphite initial particles may have an average particle diameter ($D_{50}$) of 10 μm to 30 μm, specifically 13 μm to 20 μm, more specifically 13.5 μm to 19.5 μm.

When the average particle diameter ($D_{50}$) of the secondary particles is less than 10 μm, it may be difficult for the active material to be evenly dispersed in slurry. When the average particle diameter ($D_{50}$) of the secondary particles is greater than 30 μm, charging properties and lifespan properties may be deteriorated. Accordingly, when the average particle diameter ($D_{50}$) of the secondary particles satisfies the range of 10 μm to 30 μm, excellent dispersibility, charging properties, and lifespan properties may be exhibited.

In addition, in an embodiment of the negative electrode active material according to the present invention, an average particle diameter ($D_{10}$) of the artificial graphite secondary particles may be 40% to 70% of the average particle diameter ($D_{50}$), and an average particle diameter ($D_{90}$) of the artificial graphite secondary particles may be 156% to 200% of the average particle diameter ($D_{50}$). In addition, specifically, the average particle diameter ($D_{10}$) of the artificial graphite secondary particles may be 45% to 70% of the average particle diameter ($D_{50}$), and the average particle diameter ($D_{90}$) of the artificial graphite secondary particles may be 156% to 190% of the average particle diameter ($D_{50}$). More specifically, the average particle diameter ($D_{10}$) of the artificial graphite secondary particles may be 49% to 65% of the average particle diameter ($D_{50}$), and the average particle diameter ($D_{90}$) of the artificial graphite secondary particles may be 157% to 182% of the average particle diameter ($D_{50}$).

When the artificial graphite secondary particles satisfy the average particle diameter ($D_{10}$), the average particle diameter ($D_{50}$), and the average particle diameter ($D_{90}$) in the above ranges, particle uniformity is increased and excellent tap density is obtained, and when coating an electrode, an excellent loading amount may be exhibited.

The negative electrode active material of the present invention may have a value ($V_1$) obtained by dividing a minimum particle diameter ($D_{min}$) of the secondary particles by the average particle diameter ($D_{50}$) of the initial particles of 0.50 to 0.8, and may have a value ($V_2$) obtained by dividing the minimum particle diameter ($D_{min}$) of the secondary particles by an average particle diameter ($D_{50}$) of the secondary particles of 0.23 to 0.4. Specifically, the value ($V_1$) obtained by dividing the minimum particle diameter ($D_{min}$) of the secondary particles by the average particle diameter ($D_{50}$) of the initial particles of 0.53 to 0.75, and has the value ($V_2$) obtained by dividing the minimum particle diameter ($D_{min}$) of the secondary particles by the average particle diameter ($D_{50}$) of the secondary particles of 0.23 to 0.4.

The negative electrode active material of the present invention may be that wherein the size of artificial graphite secondary particles and the size of artificial graphite initial particles making up the secondary particles are adjusted to a suitable ratio, so that a negative electrode active material comprising the artificial graphite secondary particles may exhibit excellent rapid charging properties.

Specifically, artificial graphite secondary particles included in the negative electrode active material according to an embodiment of the present invention may be formed by granulating artificial graphite initial particles having a relatively small particle diameter than typical artificial graphite secondary particles. The value ($V_1$) obtained by dividing the minimum particle diameter ($D_{min}$) of the secondary particles by the average particle diameter ($D_{50}$) of the initial particles may have a lower limit of 0.50 or greater, specifically 0.53 or greater. Since artificial graphite secondary particles having a relatively large particle size were formed by using artificial graphite initial particles having a relatively small average particle diameter ($D_{50}$), Li may move more easily due to a short diffusion distance of Li between the artificial graphite initial particles in the artificial graphite secondary particles, so that low resistance and rapid charging performance may be exhibited while exhibiting excellent dispersibility. Also, the value ($V_1$) obtained by dividing the minimum particle diameter ($D_{min}$) of the secondary particles by the average particle diameter ($D_{50}$) of the initial particles may have an upper limit of 0.8 or less, specifically 0.75 or less. When exceeding the value in the above range, the particle diameter of initial particles is increased beyond an appropriate level so that the diffusion distance of Li between the initial particles is increased, or there may be present secondary particles having a smaller particle diameter than an appropriate level.

Meanwhile, the value ($V_2$) obtained by dividing the minimum particle diameter ($D_{min}$) of the artificial graphite secondary particles included in the negative electrode active material according to an embodiment of the present invention by the average particle diameter ($D_{50}$) of the secondary particles may be 0.23 to 0.4, specifically 0.23 to 0.33. When less than 0.23, there may be present secondary particles having a smaller particle diameter than an appropriate level. When greater than 0.4, the density of a negative electrode may be reduced.

In the present invention, the average particle diameter ($D_{10}$) may be defined as a diameter at 10% in a diameter distribution. The average particle diameter ($D_{50}$) may be defined as a particle diameter at 50% in a particle diameter distribution. The average particle diameter ($D_{90}$) may be defined as a particle diameter at 90% in a particle diameter distribution. The measurement of the average particle diameter is not particularly limited, but may be measured by a laser diffraction method or by using a SEM photograph. When using the laser diffraction method, it is possible to measure a particle diameter of from a sub-micron region to several millimeters, and thus, it is possible to obtain results with high reproducibility and high resolution.

The artificial graphite secondary particles may have an average value of $I_D/I_G$ (defined below) of 0.18 to 1 obtained by Raman spectroscopy, specifically 0.18 to 0.5, more specifically 0.18 to 0.25. When the average value of $I_D/I_G$ of the artificial graphite secondary particles satisfies the range of 0.18 to 1, excellent rapid charge performance and initial efficiency along with appropriate capacity may be exhibited. When the average value of $I_D/I_G$ is less than 0.18, as it gets closer to crystalline, capacity may be relatively increased but rapid charging performance may be deteriorate. When the average value of $I_D/I_G$ is greater than 1, as a defect region increases in artificial graphite secondary particles, initial efficiency may be deteriorated due to a reaction with an electrolyte. Accordingly, there is a need to control the average value of $I_D/I_G$ of the artificial graphite secondary particles to be in an appropriate range.

A peak present in a region near the wave number 1580 $cm^{-1}$ in a spectrum obtained by the Raman spectroscopy is referred to as a G band, which is a peak indicating a $sp^2$ bond in artificial graphite, and which represents a carbon crystal with no structural defects. Meanwhile, a peak present in a region near the wave number 1358 $cm^{-1}$ in a Raman spectrum is referred to as a D band, which is a peak indicating a $sp^3$ bond in artificial graphite, and which increases when an atomic bond formed by the $sp^2$ bond is broken and becomes the $sp^3$ bond. The above D band increases when disorders or defects present in the defective graphite are generated, so that it is possible to quantitatively evaluate the degree of disorder or defect generation by calculating the ratio ($I_D/I_G$) of the maximum peak intensity ($I_D$) of the D band to the maximum peak intensity ($I_G$) of the G band.

In the present invention, the G band of the Raman spectrum for the defective graphite may be a peak present in the Raman shift 1580 $cm^{-1}$ region, and the D band may be a peak present in the Raman shift 1358 $cm^{-1}$ region. The wave number range for the G band and D band corresponds to a range which may be shifted according to a laser light source used in the Raman analysis method. The Raman value used in the present invention is not particularly limited, but may be measured at a laser wavelength of 532 nm using a DXR Raman Microscope (Thermo Electron Scientific Instruments LLC).

Meanwhile, in the negative electrode active material according to an embodiment of the present invention, the artificial graphite secondary particles as measured by XRD may have a c-axis direction crystal size (Lc) of 84 nm to 90 nm, and an a-axis direction crystal size (La) of 250 nm to 280 nm. Also, specifically, the artificial graphite secondary particles may have a c-axis direction crystal size (Lc) of 84 nm to 88 nm, and an a-axis direction crystal size (La) of 250 nm to 275 nm, more specifically a c-axis direction crystal size (Lc) of 84 nm to 86 nm, and an a-axis direction crystal size (La) of 250 nm to 270 nm.

The crystal size in the a-axis direction of the artificial graphite secondary particles means the width in the a-axis direction of a crystal calculated based on the diffraction line of a (110) crystal plane of the artificial graphite secondary particles, and means the crystal size in the (110) plane.

Artificial graphite crystals are characterized by having a base plane ((002) plane) which is perpendicular to the c-axis direction and a crystal structure of an edge plane ((110) plane) which is parallel to the c-axis direction. The base plane is relatively non-active to an electrochemical reaction, while the edge plane exhibits a very strong active structure, so that the artificial graphite exhibits anisotropy. The anisotropy of the artificial graphite may affect an electrochemical reaction of a lithium secondary battery.

When the crystal size in the a-axis direction of the artificial graphite secondary particles is less than 250 nm, crystallinity is low, and thus, the capacity of the active material is small. Therefore, in order to manufacture a secondary battery comprising the same to have a high capacity, the thickness of the negative electrode is increased, so that the lifespan properties may be deteriorated. Also, when the crystal size in the a-axis direction of the artificial graphite secondary particles is greater than 280 nm, a distance in which lithium ions are diffused after being intercalated between graphite layers is long, so that the intercalation and de-intercalation of lithium ions may not be easily achieved. Thus, diffusion resistance increases and lithium precipitation occurs during high-rate charge and discharge, so that lifespan properties are deteriorated. When artificial graphite secondary particles having a crystal size in the a-axis direction in the range of 250 nm to 280 nm are used, a distance in which lithium ions are diffused after being intercalated is relatively short, and thus, the diffusion resistance of lithium ions is small, so that the intercalation and de-intercalation of lithium ions may be achieved freely.

Also, in an embodiment of the present invention, the artificial graphite secondary particles as measured by XRD have an interplanar distance (d002) between (002) planes of 0.330 nm to 0.3356 nm, and a degree of graphitization (DOG) of 97% to 99%. Specifically, the artificial graphite secondary particles as measured by XRD have an interplanar distance (d002) of 0.3351 nm to 0.3356 nm between (002) planes, and the degree of graphitization (DOG) of 97.1% to 99%. More specifically, as measured by XRD, the interplanar distance (d002) between the (002) planes may be 0.3353 nm to 0.3356 nm, and the degree of graphitization (DOG) may be 97.2% to 98%. When the degree of graphitization of the artificial graphite secondary particles satisfies the range of 97% to 99%, high capacity and rapid charging performance may achieve a balance.

At this time, the interplanar distance (d002) of the artificial graphite secondary particles may refer to a distance between (002) crystal planes which are parallel to each other. Depending on the interplanar distance, the degree to which lithium ions are intercalated and de-intercalated may vary, and thus, the capacity of artificial graphite secondary particles may also vary.

When the interplanar distance (d002) between (002) planes of the artificial graphite secondary particles is less than 0.330 nm, it is not easy for lithium ions to be intercalated/de-intercalated into and from the interplanar distance, so that diffusion resistance increases and lithium precipitation occurs at a high rate charging/discharging, causing lifespan properties to be deteriorated.

When artificial graphite secondary particles satisfying the interplanar distance within the range of 0.330 nm to 0.3356 nm are included, it is possible to secure a space between the (002) crystal planes of the artificial graphite, the space in which lithium ions are easily intercalated/de-intercalated, allowing the diffusion resistance of the lithium ions to be small, so that the lithium ions may be freely intercalated/de-intercalated and excellent rapid charging properties may be exhibited.

In addition, the artificial graphite secondary particles have a degree of graphitization in the range of 97% to 99%, thereby having excellent crystalline, so that the effect of having high capacity may be exhibited.

Meanwhile, in order to measure the interplanar distance (d002) between the (002) planes, the crystal size in the a-axis and c-axis directions, and the degree of graphitization (DOG) of the artificial graphite, X-ray diffraction analysis may be performed using artificial graphite particles in powder form.

For example, as an example of a method for measuring the size of the interplanar distance and the crystal size in the a-axis and c-axis directions, the X-ray diffraction analysis may be performed using a Cu-kα line using an X-ray diffraction analyzer Bruker D4 enderavan, and values may be corrected through a Topas3 fitting program. The measurement was performed using high-purity silicon as an internal standard sample, and was calculated according to a method of the Japan Society for Promotion of Scientific Research (measurement method established by the $17^{th}$ Committee of the Japan Association).

Meanwhile, the method of the Japan Society for Promotion of Scientific Research may be used to compensate for an error due to the material properties of graphite with a standard sample by having a stable sample the structure of which is well known such as silicon as an internal standard sample.

As an example of a measurement method by the method of the Japan Society for Promotion of Scientific Research, an embodiment of the artificial graphite of the present invention, which is a negative electrode active material, is mixed with 20-30 wt % of Si which is an internal standard sample to measure powder XRD, and using the data, the diffraction angle corresponding to the (002) crystal plane of the artificial graphite and the diffraction angle of Si (111) are obtained. Through the above, an artificial graphite diffraction angle corrected with Si, which is an internal standard sample, is obtained, and the distance between the (002) crystal planes and the size of a crystallite in the a-axis direction may be calculated using Bragg's law.

Meanwhile, the specific surface area of the artificial graphite secondary particles may be 1.8 m$^2$/g to 3 m$^2$/g, specifically 1.8 m$^2$/g to 2.5 m$^2$/g, more specifically 1.9 m$^2$/g to 2.3 m$^2$/g. The artificial graphite secondary particles may have the specific surface area in the range of 1.8 m$^2$/g to 3 m$^2$/g, and thus, may exhibit the effect of high-speed charging and discharging without the deterioration of initial efficiency or the difficulty of dispersion.

In an embodiment of the present invention, the artificial graphite initial particles may be prepared by heat treating a carbon-based material at a temperature of 2800° C. to 3000° C., and the artificial graphite secondary particles may be prepared by mixing the artificial graphite initial particles with a binder and then heat treating the mixture at a temperature of 1000° C. to 1600° C.

In an embodiment of the present invention, the carbon-based material may comprise one or more coal-based heavy oil, petroleum-based heavy oil, tar, pitch, or cokes, and the like, specifically, one or more carbon-based materials selected from the group consisting of needle cokes, mosaic cocks, and coal tar pitch, and may have a flat shape. More specifically, the carbon-based material may be needle cokes.

The carbon-based material may be pulverized using a jet mill or a pin mill, and then sieved to be pulverized.

The heat treatment for preparing the initial particles may be performed for 15-25 hours under an inert (e.g., Ar) gas atmosphere.

In addition, the method for preparing the secondary particles by agglomerating the artificial graphite initial particles is not particularly limited and any method typically known in the art may be used. For example, artificial graphite initial particles and a binder may be mixed and then heat treated to prepare secondary particles in which the artificial graphite initial particles are agglomerated.

At this time, the binder may comprise at least one selected from the group consisting of cokes, petroleum-based pitch, and coal-based pitch which were used in preparing the initial particles.

The artificial graphite initial particles and the binder may be mixed in a weight ratio of 85:15 to 98:2. When the weight ratio of artificial graphite initial particles and a binder satisfies the above range, secondary particles having an appropriate size may be prepared and good initial efficiency may be implemented.

The heat treatment for forming the secondary particles may be performed for 7-12 hours under an inert gas atmosphere.

During the heat treatment, the binder included for forming artificial graphite secondary particles may be coated on the surface of the artificial graphite secondary particles and form a carbon coating layer.

Preferably, the carbon coating layer may be included in an amount of 10 wt % or less, specifically 3-5 wt % based on the total weight of the negative electrode active material particles.

In addition, the present invention provides a negative electrode for a lithium secondary battery, the negative electrode comprising the negative electrode active material. The negative electrode may comprise the negative electrode active material according to one example of the present invention, and selectively, at least one of a conductive material and a binder.

In an embodiment of the present invention, a negative electrode for a lithium secondary battery, the negative electrode comprising the negative electrode active material, may have an electrode orientation measured by XRD when the negative electrode has a porosity of 28% of 13.5 or less, specifically 5 to 13.5, more specifically 7 to 13.5.

The orientation ($I_{004}/I_{110}$) of the negative electrode active material layer is a peak intensity ratio ($I_{004}/I_{110}$) of the (004) plane and the (110) plane by an electrode state X-ray diffraction analysis. The peak intensity ratio ($I_{004}/I_{110}$) may be obtained through an X-ray diffraction analysis, and the electrode state X-ray diffraction analysis means that the negative active material is prepared in a negative electrode state and then subjected to an X-ray diffraction analysis. The X-ray diffraction analysis may be performed using a Cu-kα line using an X-ray diffraction analyzer Bruker D4 Endeavor, and values may be corrected through a Topas3 fitting program. The measurement was performed using high-purity silicon as an internal standard sample, and was calculated according to a method of the Japan Society for Promotion of Scientific Research (measurement method established by the 17$^{th}$ Committee of the Japan Association).

The negative electrode of the present invention may be prepared by mixing a negative electrode mixture containing the negative electrode active material particles, a conductive material and a binder in a solvent to prepare negative electrode slurry, and then applying the same as a negative electrode active material layer on a negative electrode current collector, followed by drying and roll-pressing.

At this time, in an embodiment, the negative electrode active material may be included in an amount of 80 wt % to 99 wt % based on the total weight of the negative electrode active material layer.

Also, the negative electrode current collector may typically have a thickness of 3 μm to 500 μm, and is not particularly limited as long as it has high conductivity without causing a chemical change in the battery. For example, copper, stainless steel, aluminum, nickel, titanium, fired carbon, or aluminum or stainless steel that is surface-treated with one of carbon, nickel, titanium, or silver, and the like may be used.

The binder is a component for assisting in bonding of the negative electrode active material and the conductive material, and in bonding to a current collector, and is typically added in an amount of 1 to 30 wt % based on the total weight of negative electrode active material slurry. Examples of the binder may comprise any one selected from the group consisting of a polyvinylidene fluoride-hexafluoropropylene copolymer (PVDF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), styrene-butadiene rubber (SBR), and fluorine rubber, or a mixture of two or more thereof. In particular, carboxymethylcellulose (CMC) and styrene-butadiene rubber (SBR) may be mixed and used.

The conductive material is a component for further improving the conductivity of a negative electrode active material, and may be added in an amount of 1 to 20 wt % based on the total weight of negative electrode actively slurry. The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used.

The solvent may be included in an amount such that the concentration of a negative electrode mixture solid comprising a negative electrode active material, and selectively a binder and a conductive material is 50 wt % to 95 wt %, preferably 70 wt % to 90 wt %.

The solvent is not particularly limited, but may comprise water, or an organic solvent such as isopropyl alcohol, N-methyl pyrrolidone (NMP), or acetone.

The applying may be performed by a method typically known in the art. For example, the negative electrode active material slurry may be distributed on an upper surface of one side of the negative electrode current collector, and then uniformly dispersed by using a doctor blade or the like. In addition, the applying may be performed by a method such as die casting, comma coating, screen printing, and the like.

The drying is not particularly limited, but may be performed in a vacuum oven at 50° C. to 200° C. within 1 day.

In the negative electrode comprising the negative electrode active material of the present invention, lithium precipitation may not occur during a high-rate charging test, so that the effect of improving lifespan properties may be implemented.

In addition, an embodiment of the present invention provides a lithium secondary battery having high capacity and excellent high rate properties and lifespan properties by comprising the negative electrode of the present invention, a positive electrode, a separator interposed between the negative electrode and the positive electrode, and an electrolyte.

Specifically, even when a high rate charging and discharging are performed at a rate of 1.5 C to 2.0 C, lithium precipitation does not occur in the lithium secondary battery.

At this time, the positive electrode may be prepared by mixing a positive electrode mixture containing positive electrode active material particles, and selectively a conductive material and a binder in an organic solvent to prepare positive electrode active material slurry, and then applying the positive electrode active material slurry on a positive electrode current collector, followed by drying and roll-pressing.

At this time, the positive electrode current collector may be the same or different from the negative electrode current collector described above. Specifically, a positive electrode current collector having a thickness of 3 μm to 500 μm may be used, and any positive electrode current collector having conductivity without causing a chemical change in a battery, for example, stainless steel, aluminum, nickel, titanium, fired carbon, or aluminum or stainless steel that is surface-treated with one of carbon, nickel, titanium, silver, and the like may be used.

The positive electrode active material is not particularly limited, but a positive electrode active material typically known in the art may be used, such as a compound capable of reversible intercalation and de-intercalation of lithium. Specifically, a lithium composite metal oxide containing one or more metals such as cobalt, manganese, nickel or aluminum, and containing lithium may be used. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-y}Mn_yO_2$ (wherein $0<y<1$), $LiMn_{2-z}Ni_zO_4$ (wherein $0<z<2$), etc.), a lithium-nickel-cobalt-based oxide (e.g., $LiNi_{1-y1}Co_{y1}O_2$ (wherein $0<y1<1$), etc.), a lithium-manganese-cobalt-based oxide (e.g., $LiCo_{1-y2}Mn_{y2}O_2$ (wherein $0<y2<1$), $LiMn_{2-z1}Co_{z1}O_4$ (wherein $0<z1<2$, etc.), a lithium-nickel-manganese-cobalt-based oxide (e.g., $Li(Ni_pCO_{q1}Mn_R)O_2$ (wherein $0<p<1$, $0<q<1$, $0<r<1$, $p+q+r=1$) or $Li(Ni_{p1}Co_{q1}Mn_{r1})O_4$ (wherein $0<p1<2$, $0<q1<2$, $0<r1<2$, $p1+q1+r1=2$, etc.), or a lithium-nickel-cobalt-transition metal (M) oxide (e.g., $Li(Ni_{p2}Co_{q2}Mn_{r2}M_{s2})O_2$ (wherein M is selected from the group consisting of Al, Fe, V, Cr, Ti, Ta, Mg, and Mo, and p2, q2, r2, and s2 are each an atomic fraction of independent elements, and $0<p2<1$, $0<q2<1$, $0<r2<1$, $0<s2<1$, $p2+q2+r2+s2=1$, etc.) and the like, and any one thereof or a compound of two or more thereof may be included. Among these, due to the fact that the capacity properties and stability of a battery may be increased, the lithium composite metal oxide may be $LiCoO_2$, $LiMnO_2$, $LiNiO_2$, a lithium nickel-manganese-cobalt oxide (e.g., $Li(Ni_{0.6}Mn_{0.2}Co_{0.2})O_2$, $LiNi_{0.5}Mn_{0.3}Co_{0.2}O_2$, or $LiNi_{0.8}Mn_{0.1}Co_{0.1}O_2$, etc.), or a lithium nickel cobalt aluminum oxide (e.g., $LiNi_{0.8}Co_{0.15}Al_{0.05}O_2$, etc.), and the like. When considering a remarkable improvement effect according to the control of type and content ratio of constituent elements forming a lithium composite metal oxide, the lithium composite metal oxide may be $LiNi_{0.6}Mn_{0.2}Co_{0.2}O_2$, $LiNi_{0.5}Mn_{0.3}Co_{0.2}O_2$, $LiNi_{0.7}Mn_{0.15}Co_{0.15}O_2$, or $LiNi_{0.8}Mn_{0.1}Co_{0.1}O_2$, and the like, and any one thereof or a mixture of two or more thereof may be used.

The positive electrode active material may be included in an amount of 80 wt % to 99 wt % based on the total weight of each of the positive electrode active material slurry compositions.

The binder may be the same as or different from the binder used in the negative active material described above. Typically, the binder is added in an amount of 1 to 30 wt % based on the total weight of the positive electrode active material slurry. Examples of the binder comprise one or a mixture of two or more selected from the group consisting of a vinylidenefluoride-hexafluoropropylene copolymer, polyvinylidene fluoride, polyacrylonitrile, polymethylmethacrylate, polyvinyl alcohol, carboxymethyl cellulose, starch, hydroxypropylcellulose, regenerated cellulose, polyvinylpyrrolidone, tetrafluoroethylene, polyethylene, polypropylene, polyacrylic acid, an ethylene-propylene-diene monomer, sulfonated EPDM, styrene-butadiene rubber, and fluorine rubber. Particularly, carboxymethylcellulose and styrene-butadiene rubber may be mixed and used.

The conductive material may be the same as or different from the conductive material used in the negative active material described above. Typically, the conductive material is added in an amount of 1 to 20 wt % based on the total weight of the positive electrode active material slurry. The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; a metal oxide such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used.

The organic solvent may be included in an amount such that the concentration of a positive electrode mixture solid containing a positive electrode active material, and selectively a binder and a conductive material is 50 wt % to 95 wt %, preferably 70 wt % to 90 wt %.

The organic solvent may comprise an organic solvent such as isopropyl alcohol, n-methylpyrrolidone (NMP), or acetone.

The applying and drying may be performed in the same manner as the above-mentioned negative electrode manufacturing method.

Also, as the separator, a porous polymer film typically used as a separator, for example, a porous polymer film prepared with a polyolefin-based polymer, such as an ethylene homopolymer, a propylene homopolymer, an ethylene-butene copolymer, an ethylene-hexene copolymer, and an ethylene-methacrylate copolymer may be used alone, or in a laminated form thereof. Alternatively, a typical porous non-woven fabric, for example, a non-woven fabric formed of a glass fiber having a high melting point or polyethylene terephthalate fiber may be used, but the present invention is not limited thereto.

The electrolyte may comprise a non-aqueous organic solvent and a lithium salt.

As the non-aqueous organic solvent, for example, N-methyl-2-pyrrolidone, propylene carbonate, ethylene carbonate, butylene carbonate, dimethyl carbonate, diethyl carbonate, γ-butyrolactone, 1,2-dimethoxy ethane, 2-methyl tetrahydrofuran, dimethyl sulfoxide, 1,3-dioxolane, formamide, diemethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, methyl propionate, ethyl propionate, and the like may be used.

As the metal salt, a lithium salt may be used. The lithium salt is a material which is easily dissolved in the non-aqueous electrolyte, and may comprise, for example, any single material or a mixture of two or more elected from the group consisting of LiCl, LiBr, LiI, LiClO$_4$, LiPF$_6$, LiBF$_4$, LiB$_{10}$Cl$_{10}$, LiCF$_3$SO$_3$, LiCH$_3$CO$_2$, LiCF$_3$CO$_2$, LiCH$_3$SO$_3$, LiAsF$_6$, LiSbF$_6$, LiAlCl$_4$, LiAlO$_4$, LiFSI, LiTFSI, and LiN(C$_2$F$_5$SO$_2$)$_2$.

According to another embodiment of the present invention, a battery module comprising the lithium secondary battery as a unit cell and a battery pack comprising the same are provided. The battery module and the battery pack comprise the lithium secondary battery having excellent lifespan properties, and thus, may be used for a mobile electronic device, an electric vehicle, a hybrid electric vehicle, a plug-in hybrid electric vehicle, or a power storage device.

MODE FOR CARRYING OUT THE INVENTION

Hereinafter, the present invention will be described in more detail with reference to embodiments. However, the embodiments according to the present invention may be modified into other various forms, and the scope of the present invention should not be construed as being limited to the embodiments described below. The embodiments of the present invention are provided to more fully describe the present invention to those skilled in the art.

EXAMPLES

Example 1

(Step 1: Preparation of Negative Electrode Active Material)

Needle coke was pulverized using a jet mill, and then sieved to obtain powder having an average particle diameter (D$_{50}$) of 8 µm. The obtained initial particle powder and a binder (petroleum-based pitch) were mixed in a weight ratio of 7:1 to prepare granulated powder. The powder was heat-treated (graphitized) for 24 hours at 3,000° C. under an inert (Ar) gas atmosphere to prepare a secondary particle artificial graphite negative electrode active material having an average particle diameter (D$_{50}$) of 19.1 µm. The minimum particle diameter of the secondary particles, among other measurements, is shown in Table 1 below.

The artificial graphite secondary particles have an interplanar distance (d002) between (002) planes by a powder x-ray diffraction analysis is 0.3356 nm (DOG 97.15%), a size of a crystallite in a c-axis direction of 269.5 nm, a peak intensity ratio (I$_{004}$/I$_{110}$) of plane (004) and plane (110) by an electrode state X-ray diffraction analysis of 12.6.

(Step 2: Manufacturing of Negative Electrode)

The negative electrode active material prepared in Step 1, Super C65 as a conductive material, styrene butadiene rubber as a binder, and carboxymethylcellulose as a thickening agent were mixed in a weight ratio of 95.6:1:2.3:1.1, and then added with water to prepare negative electrode slurry. The negative electrode slurry was applied on copper foil and then vacuum dried for 10 hours at about 130° C. to manufacture a negative electrode having a loading capacity of 3.6 mAh/cm$^2$.

(Step 3: Manufacturing of Secondary Battery)

The negative electrode manufactured in Step 2 was cut to a size of 1.4875 cm$^2$, and then a polyethylene separator was interposed between the negative electrode and a positive electrode which was prepared by using metal lithium foil having a size of 1.8 cm$^2$ to manufacture an electrode assembly. A non-aqueous electrolyte solvent in which ethylene carbonate and diethylene carbonate are mixed in a volume ratio of 3:7 was added with 0.5 wt % of vinylidene carbonate and 1 M of LiPF$_6$ to prepare a non-aqueous electrolyte. Thereafter, the non-aqueous electrolyte was injected into the electrode assembly to manufacture a coin-type half secondary battery.

Example 2

Petroleum-based green coke was pulverized using a jet mill, and then sieved to obtain powder having an average particle diameter (D$_{50}$) of 10 µm. The initial particle petroleum-based green coke and natural graphite powder having an average particle diameter (D$_{50}$) of 8 µm were mixed in a weight ratio of 30:70, and then mixed with a binder (petroleum-based pitch) in a weight ratio of 6:1 and granulated to prepare powder having an average particle diameter ($D_{50}$) of 8 μm.

The artificial graphite initial particles and the natural graphite initial particles were granulated and agglomerated to prepare a negative electrode active material composed of secondary particles having an average particle diameter ($D_{50}$) of 15.1 μm.

Using the prepared negative electrode active material, a negative electrode and a coin-type half secondary battery were manufactured in the same manner as in Example 1.

Example 3

Needle coke was pulverized using a jet mill, and then sieved to obtain powder having an average particle diameter ($D_{50}$) of 8 μm. The obtained initial particle powder and a binder (petroleum-based pitch) were mixed in a weight ratio of 5:1 to prepare granulated powder. The powder was heat-treated (graphitized) for 24 hours at 3,000° C. under an inert (Ar) gas atmosphere to prepare a secondary particle artificial graphite negative electrode active material having an average particle diameter ($D_{50}$) of 18.3 μm.

Using the prepared negative electrode active material, a negative electrode and a coin-type half secondary battery were manufactured in the same manner as in Example 1.

Example 4

Needle coke was pulverized using a jet mill, and then sieved to obtain powder having an average particle diameter ($D_{50}$) of 6 μm. The obtained initial particle powder and a binder (petroleum-based pitch) were mixed in a weight ratio of 6:1 to prepare granulated powder. The powder was heat-treated (graphitized) for 24 hours at 3,000° C. under an inert (Ar) gas atmosphere to prepare a secondary particle artificial graphite negative electrode active material having an average particle diameter ($D_{50}$) of 15.8 μm.

Using the prepared negative electrode active material, a negative electrode and a coin-type half secondary battery were manufactured in the same manner as in Example 1.

Example 5

Needle coke was pulverized using a jet mill, and then sieved to obtain powder having an average particle diameter ($D_{50}$) of 7 μm. A process in which the powder is heat-treated (graphitized) for 24 hours at 3,000° C. under an inert (Ar) gas atmosphere was performed first.

Thereafter, the obtained initial particle powder and a binder (petroleum-based pitch) were mixed in a weight ratio of 6:1, and then subjected to a low-temperature heat treatment at 600° C. under an inert (Ar) gas atmosphere to perform granulation and carbonization simultaneously to prepare a secondary particle artificial graphite negative electrode active material having an average particle diameter ($D_{50}$) of 13.9 μm.

Using the prepared negative electrode active material, a negative electrode and a coin-type half secondary battery were manufactured in the same manner as in Example 1.

Comparative Example 1

(Step 1: Preparation of Negative Electrode Active Material)

Needle coke was pulverized using a jet mill, and then sieved to obtain powder having an average particle diameter ($D_{50}$) of 10 μm. The obtained initial particle powder and a binder (petroleum-based pitch) were mixed in a weight ratio of 7:1 to prepare granulated powder. The powder was heat-treated (graphitized) for 24 hours at 3,000° C. under an inert (Ar) gas atmosphere to prepare a secondary particle artificial graphite negative electrode active material having an average particle diameter ($D_{50}$) of 20.9 μm.

The artificial graphite secondary particles have an interplanar distance (d002) between (002) planes obtained by a powder x-ray diffraction analysis of 0.335680 nm (DOG 96.7%), a size of a crystallite in a c-axis direction of 266 nm, a peak intensity ratio ($I_{004}/I_{110}$) of plane (004) and plane (110) by an electrode state x-ray diffraction analysis of 16.5.

Using the prepared negative electrode active material, a negative electrode and a coin-type half secondary battery were manufactured in the same manner as in Example 1.

Comparative Example 2

Needle coke was pulverized using a jet mill, and then sieved to obtain powder having an average particle diameter ($D_{50}$) of 11 μm. The obtained initial particle powder and a binder (petroleum-based pitch) were mixed in a weight ratio of 7:1 to prepare granulated powder. The powder was heat-treated (graphitized) for 24 hours at 3,000° C. under an inert (Ar) gas atmosphere to prepare a secondary particle artificial graphite negative electrode active material having an average particle diameter ($D_{50}$) of 18.9 μm.

Comparative Example 3

Needle coke was pulverized using a jet mill, and then sieved to obtain powder having an average particle diameter ($D_{50}$) of 11 μm. The obtained initial particle powder and a binder (petroleum-based pitch) were mixed0 in a weight ratio of 5:1 to prepare granulated powder. The powder was heat-treated (graphitized) for 24 hours at 3,000° C. under an inert (Ar) gas atmosphere to prepare a secondary particle artificial graphite negative electrode active material having an average particle diameter ($D_{50}$) of 36.0 μm.

Experimental Examples

Experimental Example 1: Negative Electrode Active Material Analysis

The negative electrode active material prepared in each of Example 1 and Comparative Example 1 were analyzed in the following manner.

(1) Particle Size Distribution

The particle size distribution (PSD) of the negative electrode active material of each of Examples 1 to 5 and Comparative Examples 1 to 2 were measured using 'CILAS920, France' of ILAS Co. and 'Mastersizer2000, USA' of MALVERN Co. and the results are shown in Table 1 below. The PSD measurement results of Example 1 and Comparative Example 1 are shown in FIG. 1 as a graph.

(2) Crystallinity of Active Material

Figure 2:
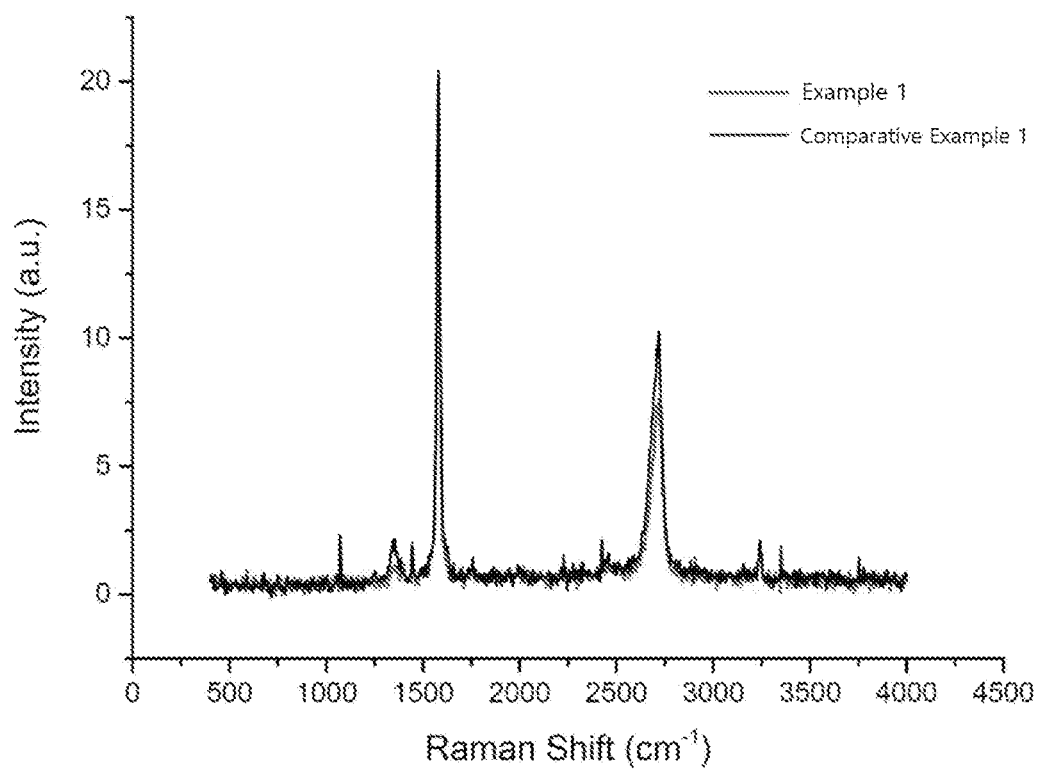
FIG. 2 is a view showing the results of measuring a ratio ($I_D/I_G$, R value) of the maximum peak intensity ($I_G$) of a G-band at 1580±50 cm$^{-1}$ to the maximum peak intensity ($I_D$) of a D band at 1360±50 cm$^{-1}$ obtained by Raman spectroscopy for each of the negative electrode active materials of Example 1 and Comparative Example 1.

A ratio ($I_D/I_G$, R value) of the maximum peak intensity of a D band ($I_D$) in the range of 1360±50 $cm^{-1}$ to the maximum peak intensity of a G band $I_G$ in the range of 1580±50 $cm^{-1}$ obtained by DXR Raman Microscope(Thermo Electron Scientific Instruments LLC) was measured and is shown in FIG. 2 and Table 2.

(3) Powder XRD

The negative electrode active material of each of Example 1 and Comparative Example 1 was filled in a special holder for XRD equipment and pressed with a slide glass to flatten the surface, and then subjected to an XRD analysis. The results are shown in Table 2.

A plane (110) and a plane (004) of the negative electrode active material included in a negative electrode were measured by XRD and the degree of orientation was calculated by an area ratio ((110)/(004)) obtained by integrating the peak intensities of the plane (110) and the plane (004). Specifically, the XRD measurement conditions were as follows.

Target: Cu(Kα-line) Graphite monochrome device
Slit: Diverging slit=1 degree, receiving slit=0.1 mm, scattering slit=1 degree
Measurement area and step angle/Measurement time:
(110) Plane: 76.5 degrees<2θ<78.5 degrees, 0.01 degrees/3 seconds
(004) Plane: 53.5 degrees<2θ<56.0 degrees, 0.01 degrees/3 seconds, wherein 2θ represents the diffraction angle.

(4) Specific Surface Area

Using a porosimetry analyzer (Bell Japan Inc., Belsorp-II mini), the specific surface area was measured by the BET 6-point method by the nitrogen gas adsorption/distribution method. The results are shown in Table 2 below.

(5) Tap Density

The negative electrode active material of each of Example 1 and Comparative Example 1 was filled in a container, and the apparent density of particles which is obtained by vibrating (40 g, 1000 times) under a constant condition was measured. The results are shown in Table 2 below.

a large minimum particle diameter ($D_{min}$) and a large maximum particle diameter ($D_{max}$) when compared with that of Comparative Example 1. In addition, referring to Table 2 and FIG. 2, the negative electrode active material of Example 1 has a relatively low tab density when compared with the negative active material of Comparative Example 1, and has a relatively large specific surface area.

Experimental Example 2: Negative Electrode Analysis (1) Electrode Orientation

Figure 3:
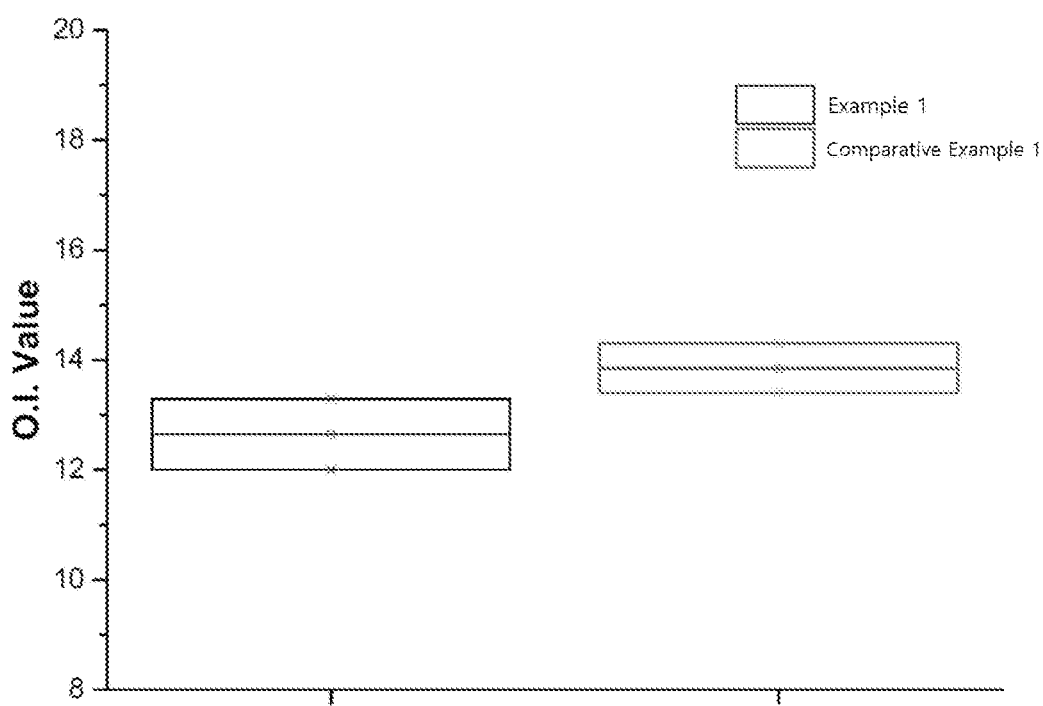
FIG. 3 is a view showing the results of evaluating the orientation of negative electrode slurry used in manufacturing a negative electrode in Example 1 and Comparative Example 1 by X-ray diffraction (XRD) analysis.

The orientation of the negative electrode slurry used in manufacturing a negative electrode in each of Example 1 and Comparative Example 1 was evaluated by X-ray diffraction (XRD) analysis, and the results are shown in FIG. 3 and Table 3.

Specifically, the negative electrode slurry prepared in each of Example 1 and Comparative Example 1 was placed into a bowl made of aluminum foil, and dried completely in an oven of 110° C. The dried slurry powder was finely ground using a mortar and pestle, and then sieved using a 250 mesh sieve. Thereafter, 1 g thereof was weighed into a pellet jig to prepare pellets such that a mixture density region of 1.50 g/cc to 1.80 g/cc was reached. The finished slurry pellet was allowed to stand for 6 hours, and then the weight and thickness of the pellets were measured. At this time, a mixture density was calculated by the measured thickness and weight. The slurry pellet was filled in a special holder for XRD equipment and pressed with a slide glass to flatten

TABLE 1

| | Second particle (μm) | | | | | First particle (μm) | $D_{min}/D_{50}$ (First value) | $D_{min}/D_{50}$ (Second value) | $D_{10}/D_{50}$ (%) | $D_{90}/D_{50}$ (%) |
|---|---|---|---|---|---|---|---|---|---|---|
| | $D_{max}$ | $D_{90}$ | $D_{50}$ | $D_{10}$ | $D_{min}$ | $D_{50}$ | | | | |
| Example 1 | 78.7 | 31 | 19.1 | 11.3 | 4.9 | 8 | 0.61 | 0.26 | 59.2 | 162.3 |
| Example 2 | 52.3 | 23.7 | 15.1 | 9.1 | 4.2 | 8 | 0.53 | 0.28 | 60.3 | 157.0 |
| Example 3 | 88.0 | 29.6 | 18.3 | 11.9 | 6 | 8 | 0.75 | 0.33 | 65.0 | 161.7 |
| Example 4 | 63.2 | 28.7 | 15.8 | 7.8 | 3.6 | 6 | 0.6 | 0.23 | 49.4 | 181.6 |
| Example 5 | 74.0 | 23.8 | 13.9 | 8.6 | 4.2 | 7 | 0.6 | 0.30 | 61.9 | 171.2 |
| Comparative Example 1 | 74.0 | 32.4 | 20.9 | 13.4 | 4.6 | 10 | 0.46 | 0.22 | 64.1 | 155.0 |
| Comparative Example 2 | 88.0 | 32.7 | 18.9 | 9.3 | 4.2 | 11 | 0.38 | 0.22 | 49.2 | 173.0 |
| Comparative Example 3 | 124.0 | 61.2 | 36.0 | 17.6 | 9.4 | 11 | 0.85 | 0.26 | 48.9 | 170.2 |

TABLE 2

| | Active material XRD | | | | | Specific surface area ($m^2/g$) | Tap density (g/cc) |
|---|---|---|---|---|---|---|---|
| | $I_D/I_G$ (R value) | d002 (nm) | Lc (nm) | La (nm) | DOG (%) | | |
| Example 1 | 0.18 | 0.3356 | 85.6 | 269.5 | 97.15 | 1.9 | 0.89 |
| Comparative Example 1 | 0.12 | 0.3557 | 83.9 | 280.5 | 96.71 | 1.8 | 0.91 |

As shown in Table 1, the negative electrode active material of each of Examples 1 to 5 has a relatively small initial particle size when compared with the negative active material of each of Comparative Examples 1 to 2, but exhibited the surface, and then subjected to an XRD analysis in a range of 2θ of 20° to 80°. In the final analysis, the height of a peak (I002) appearing in the vicinity in which 2θ is 26° and the height of a peak (I110) appearing in the vicinity in which 2θ is 76° were measured.

(2) Impregnation Performance

1 μl of propylene carbonate (PC) was dropped on the surface of each negative electrode (density 1.6 g/cc, 1.4875 cm²) prepared in Example 1 and Comparative Example 1, and impregnation properties were evaluated by measuring the time it took for the propylene carbonate to completely penetrate into the negative electrode. The experiment was repeated a total of three times, and the average value and standard deviation are shown in Table 3.

TABLE 3

| | Electrode orientation @ 28% porosity | PC impregnation time (Sec) | Standard deviation (Sec) |
|---|---|---|---|
| Example 1 | 12.6 ± 0.9 | 52 | 3 |
| Comparative Example 1 | 13.8 ± 0.6 | 62 | 2 |

As shown in Table 3 and FIG. 3, the negative electrode of Example 1 exhibited a lower degree of orientation when compared with that of Comparative Example 1 and exhibited a shorter impregnation time.

Experimental Example 3: Rapid Charging Performance

The coin-type secondary battery prepared in each of Examples 1 to 5 and Comparative Example 1 to 2 was subjected to charging and discharging in which the first three cycles were performed at a rate of 0.1 C under the charging conditions of 5 mV and 0.005 C current cut-off in a CC/CV manner and discharging was performed to 1.5 V in a CC manner. Thereafter, charging was performed again to SOC 80% at a rate of 1.6 C.

Figure 4:
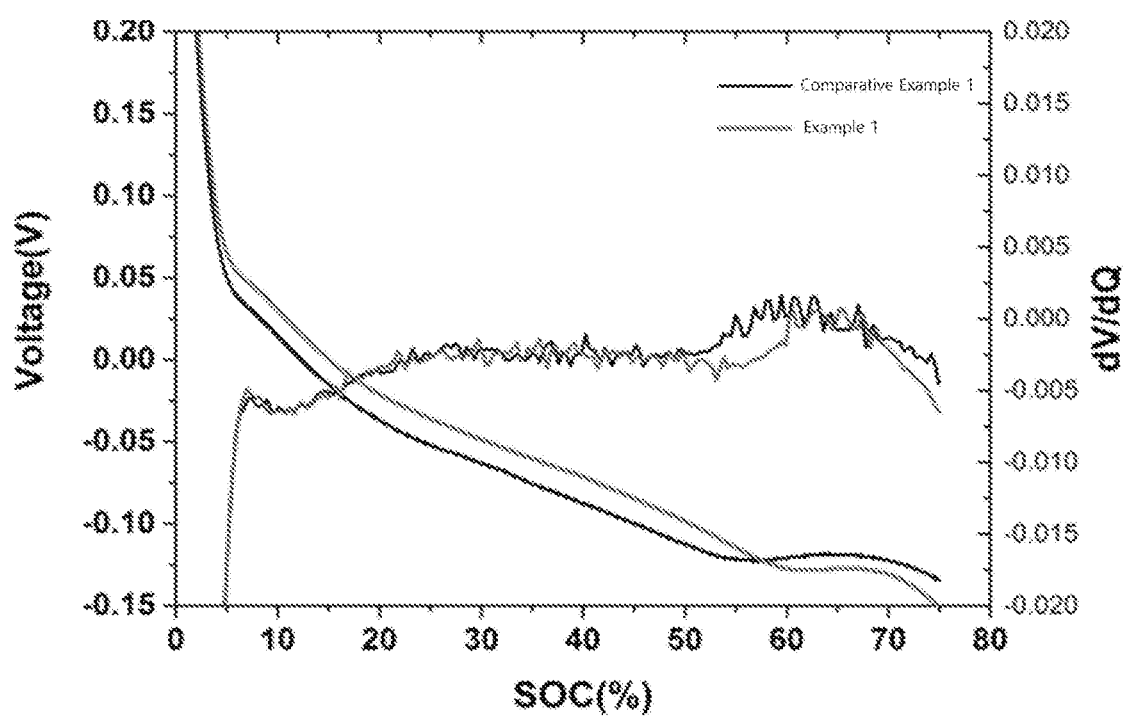
FIG. 4 is a view showing a dV/dQ curve by differentiating a negative profile when charging a secondary battery manufactured in Example 1 and Comparative Example 1 to 1.6 C, and then measuring a charge depth (SOC) of a point in which the inflection point of the curve occurs to measure a point in which lithium is precipitated.

A dV/dQ curve was obtained by differentiating a negative electrode profile when charging to 1.6 C, and then a charge depth (SOC) of a point in which the inflection point of the curve occurs was measured to measure a point in which lithium is precipitated. The results are shown in Table 4 below. FIG. 4 shows a dV/dQ curve by differentiating a negative electrode profile when charging a secondary battery manufactured in Example 1 and Comparative Example 1 at 1.6 C, and then measuring a charge depth (SOC) of a point in which the inflection point of the curve occurs to measure a point in which lithium is precipitated.

TABLE 4

| | Lithium plating occurrence SOC (@ 1.6 C, 28% porosity) |
|---|---|
| Example 1 | 59 |
| Example 2 | 59 |
| Example 3 | 63 |
| Example 4 | 65 |
| Example 5 | 63 |
| Comparative Example 1 | 54 |
| Comparative Example 2 | 54 |
| Comparative Example 2 | 40 |

As shown in Table 4, the secondary battery comprising the negative electrode of each of Examples 1 to 5 had the occurrence of lithium plating at a high SOC when compared with the secondary battery comprising the negative electrode of each of Comparative Examples 1 to 3 during rapid charging, and thus, exhibited excellent rapid charging performance as compared with that of Comparative Examples 1 to 3.

The invention claimed is:

1. A negative electrode active material, comprising:
artificial graphite secondary particles comprising artificial graphite primary particles having an average particle diameter (D50) of 10 nm to 9 μm, said artificial graphite secondary particles being formed by granulating said artificial graphite primary particles,
wherein a value ($V_1$) obtained by dividing a minimum particle diameter ($D_{min}$) of the secondary particles by the average particle diameter ($D_{50}$) of the artificial graphite primary particles is 0.50 to 0.8, and
a value ($V_2$) obtained by dividing the minimum particle diameter ($D_{min}$) of the secondary particles by an average particle diameter ($D_{50}$) of the secondary particles is 0.23 to 0.4.

2. The negative electrode active material of claim 1, wherein the average particle diameter ($D_{50}$) of the artificial graphite secondary particles is 10 μm to 30 μm.

3. The negative electrode active material of claim 1, wherein the value ($V_1$) obtained by dividing the minimum particle diameter ($D_{min}$) of the secondary particles by the average particle diameter ($D_{50}$) of the artificial graphite primary particles is 0.53 to 0.75.

4. The negative electrode active material of claim 1, wherein the value ($V_2$) obtained by dividing the minimum particle diameter ($D_{min}$) of the secondary particles by the average particle diameter ($D_{50}$) of the secondary particles is 0.23 to 0.33.

5. The negative electrode active material of claim 1, wherein an average particle diameter ($D_{10}$) of the artificial graphite secondary particles is 40% to 70% of the average particle diameter ($D_{50}$) of the artificial graphite secondary particles, and an average particle diameter ($D_{90}$) of the artificial graphite secondary particles is 156% to 200% of the average particle diameter ($D_{50}$) of the artificial graphite secondary particles.

6. The negative electrode active material of claim 1, wherein the artificial graphite secondary particles have an average value of $I_D/I_G$ of 0.18 to 1 obtained by Raman spectroscopy, wherein $I_D$ is a maximum peak intensity of a D peak and $I_G$ is a maximum peak intensity of a G peak in a Raman spectrum.

7. The negative electrode active material of claim 1, wherein the artificial graphite secondary particles as measured by X-ray diffraction (XRD) have a c-axis direction crystal size (Lc) of 84 nm to 90 nm, and an a-axis direction crystal size (La) of 250 nm to 280 nm.

8. The negative electrode active material of claim 1, wherein the artificial graphite secondary particles as measured by X-ray diffraction (XRD) have an interplanar distance (d002) of 0.330 nm to 0.3356 nm between (002) planes, and a degree of graphitization (DOG) of 97.1% to 99%.

9. The negative electrode active material of claim 1, wherein the artificial graphite secondary particles have a specific surface area of 1.8 $m^2$/g to 3 $m^2$/g.

10. The negative electrode active material of claim 1, wherein the artificial graphite secondary particles further comprise carbon-based initial particles, said carbon-based initial particles being different than the artificial graphite primary particles.

11. A negative electrode active material comprising artificial graphite secondary particles comprising artificial graphite primary particles having an average particle diameter (D50) of 10 nm to 9 μm, said artificial graphite secondary particles being formed by granulating said artificial graphite primary particles,
wherein an average particle diameter ($D_{50}$) of the artificial graphite secondary particles is 10 μm to 30 μm,
a value ($V_1$) obtained by dividing a minimum particle diameter ($D_{min}$) of the secondary particles by the average particle diameter ($D_{50}$) of the artificial graphite primary particles is 0.50 to 0.8, and a value ($V_2$) obtained by dividing the minimum particle diameter ($D_{min}$) of the secondary particles by the average particle diameter ($D_{50}$) of the secondary particles is 0.23 to 0.4, and an average particle diameter ($D_{10}$) of the artificial graphite secondary particles is 40% to 70% of the average particle diameter ($D_{50}$) of the artificial graphite secondary particles, and an average particle diameter ($D_{90}$) of the artificial graphite secondary particles is 156% to 200% of the average particle diameter ($D_{50}$) of the artificial graphite secondary particles.

12. The negative electrode active material of claim 11, wherein the artificial graphite secondary particles have an average value of $I_D/I_G$ of 0.18 to 1 obtained by Raman spectroscopy, wherein $I_D$ is a maximum peak intensity of a D peak and $I_G$ is a maximum peak intensity of a G peak in a Raman spectrum.

13. The negative electrode active material of claim 11, wherein the artificial graphite secondary particles as measured by X-ray diffraction (XRD) have an interplanar distance (d002) of 0.330 nm to 0.3356 nm between (002) planes, and a degree of graphitization (DOG) of 97.1% to 99%.

14. A negative electrode for a lithium secondary battery comprising the negative electrode active material according to claim 1.

15. The negative electrode of claim 14, wherein an electrode orientation ($I_{004}/I_{110}$) measured by X-ray diffraction (XRD) when the negative electrode has a porosity of 28% is 13.5 or less, wherein ($I_{004}/I_{110}$) is a peak intensity ratio of a (004) plane and a (110) plane of the negative electrode active material prepared in an electrode state as measured by XRD.

16. A lithium secondary battery comprising the negative electrode for a lithium secondary battery according to claim 14.

\* \* \* \* \*